United States Patent [19]

Lee

[11] 4,053,310

[45] Oct. 11, 1977

[54] DURABLE CARRIER COATING COMPOSITIONS COMPRISING POLYSULFONE

[75] Inventor: Lieng-Huang Lee, Webster, N.Y.

[73] Assignee: Xerox Corporation, Stamford, Conn.

[21] Appl. No.: 653,792

[22] Filed: Jan. 30, 1976

[51] Int. Cl.[2] ........................ G03G 13/08; G03G 9/10; B32B 15/08; B32B 27/14

[52] U.S. Cl. ............................... 96/1 SD; 252/62.1 P; 427/14; 427/216; 427/221; 428/406; 428/407

[58] Field of Search ...................... 427/14, 18, 20, 215, 427/216, 220, 221, 127; 428/403, 404, 406, 407; 252/62.1; 96/1 SD; 260/42.14; 106/308 M

[56] References Cited

U.S. PATENT DOCUMENTS

| | | | |
|---|---|---|---|
| 3,676,814 | 7/1972 | Trunzo et al. | 427/127 X |
| 3,694,359 | 9/1972 | Merrill et al. | 252/62.1 P |
| 3,873,492 | 3/1975 | Takehisa et al. | 427/221 X |

*Primary Examiner*—Ronald H. Smith
*Assistant Examiner*—Stuart D. Frenkel

[57] ABSTRACT

A carrier particle for electrostatographic developer mixtures comprising a core having a thin, wear-resistant coating of a polysulfone. The carrier coating is durable and resistant to mechanical degradation. The carrier particle is used in conjunction with finely-divided toner particles to develop electrostatic latent images.

24 Claims, No Drawings

DURABLE CARRIER COATING COMPOSITIONS COMPRISING POLYSULFONE

BACKGROUND OF THE INVENTION

This invention relates, in general, to electrostatographic imaging systems, and, in particular, to improved developer materials and their uses.

The formation and development of images on the surface of photoconductive materials by electrostatic means is well-known. The basic electrophotographic process, as taught by C. F. Carlson in U. S. Pat. No. 2,297,691, involves placing a uniform electrostatic charge on a photoconductive insulating layer, exposing the layer to a light and shadow image to dissipate the charge on the areas of the layer exposed to the light and developing the resulting electrostatic latent image by depositing on the image a finely-divided electroscopic material referred to in the art as "toner". The toner will normally be attracted to those areas of the layer which retain a charge, thereby forming a toner image corresponding to the electrostatic latent image. This powder image may then be transferred to a support surface such as paper. The transferred image may subsequently be permanently affixed to the support surface as by heat. Instead of latent image formation by uniformly charging the photoconductive layer and then exposing the layer to a light and shadow image, one may form the latent image by directly charging the layer in image configuration. The powder image may be fixed to the photoconductive layer if elimination of the powder image transfer step is desired. Other suitable fixing means such as solvent or overcoating treatment may be substituted for the foregoing heat fixing step.

Many methods are known for applying the electroscopic particles to the electrostatic latent image to be developed. One development method, as disclosed by E. N. Wise in U. S. Pat. No. 2,618,552 is well-known as "cascade" development. In this method, a developer material comprising relatively large carrier particles having finely-divided toner particles electrostatically clinging to the surface of the carrier particles is conveyed to and rolled or cascaded across the electrostatic latent image bearing surface. The composition of the toner particles is so chosen as to have a triboelectric polarity opposite that of the carrier particles. As the mixture cascades or rolls across the image bearing surface, the toner particles are electrostatically deposited and secured to the charged portion of the latent image and are not deposited on the uncharged or background portions of the image. Most of the toner particles accidentally deposited in the background are removed by the rolling carrier, due apparently, to the greater electrostatic attraction between the toner and the carrier than between the toner and the discharged background. The carrier particles and unused toner particles are then recycled. The technique is extremely good for the development of line copy images. The cascade development process is the most widely used commercial electrostatographic development technique. A general purpose office copying machine incorporating this technique is described in U. S. Pat. No. 3,099,943.

Another technique for developing electrostatic latent images is the "magnetic brush" process as disclosed, for example, in U. S. Pat. No. 2,874,063. In this method, a developer material containing toner and magnetic carrier particles is carried by a magnet. The magnetic field of the magnet causes alignment of the magnetic carriers in a brush-like configuration. This "magnetic brush" is engaged with an electrostatic latent image bearing surface and the toner particles are drawn from the brush to the electrostatic latent image by electrostatic attraction.

Another technique for developing electrostatic latent images is the "touchdown" process as disclosed, for example, in U. S. Pat. Nos. 2,895,847 and 3,245,823 to Mayo. In this method, a developer material is carried to a latent image bearing surface by a support layer such as a web or sheet and is deposited thereon in conformity with said image.

Carrier particles are made from or coated with materials having appropriate triboelectric properties as well as certain other physical characteristics. Thus, the materials employed as the carrier particles or the coatings thereon should have a triboelectric value commensurate with the triboelectric value of the toner to enable electrostatic adhesion of the toner to the carrier particles and subsequent transfer of the toner from the carrier particles to the image on the plate without excessive power requirements. Furthermore, the triboelectric properties of all the carrier particles should be relatively uniform to permit uniform pick-up and subsequent deposition of toner. The materials employed in the carrier particles should have an intermediate hardness so as not to scratch the plate or drum surface upon which the electrostatic image is initially placed while being sufficiently hard to withstand the forces to which they are subjected during recycle. The carrier particles as well as the surface thereof also should not be comprised of materials which are so brittle as to cause either flaking of the surface or particle break-up under the forces exerted on the particles during recycle. The flaking causes undesirable effects in that the relatively small flaked particles will eventually be transferred to the copy surface thereby interfering with the deposited toner and causing imperfections in the copy image. Furthermore, flaking of the carrier particle surface will cause the resultant carrier particles to have non-uniform triboelectric properties when the carrier particle is composed of a core material different from the surface coating thereon. This results in undesirable non-uniform pick-up of toner by the carrier particles and non-uniform deposition of toner on the image. In addition, when the carrier particle size is reduced, the removal of the resultant small particles from the plate becomes increasingly difficult. Thus, the type of materials useful for making carrier particles or for coating carrier particles, although having the appropriate triboelectric properties, are limited because other physical properties which they possess may cause the undesirable results discussed above.

It is highly desirable to alter triboelectric properties of the carrier cores to accommodate the use of desirable toner compositions while retaining the other desirable physical characteristics of the carrier particle. The alteration of the triboelectric properties of carrier particles by applying a surface coating thereon is a particularly desirable technique. With this technique, not only is it possible to alter the triboelectric properties of carrier particles made from materials having desirable physical characteristics, it is also possible to employ materials previously not suitable as carrier particles. Thus, for example, carrier particles having desirable physical properties with the exception of hardness, can be coated with a material having desirable hardness as well as other physical properties, rendering the resultant product useful as carrier particles.

While ordinarily capable of producing good quality images, conventional developing materials suffer serious deficiencies in certain areas. The developing materials must flow freely to facilitate accurate metering and even distribution during the development and developer recycling phases of the electrostatographic process. Some developer materials, though possessing desirable properties such as proper triboelectric characteristics, are unsuitable because they tend to cake, bridge and agglomerate during handling and storage. Adherence of carrier particles to reusable electrostatographic imaging surfaces causes the formation of undesirable scratches on the surfaces during image transfer and surface cleaning steps. The tendency of carrier particles to adhere to imaging surfaces is aggravated when the carrier surfaces are rough and irregular. The coatings of most carrier particles deteriorate rapidly when employed in continuous processes which require the recycling of carrier particles by bucket conveyors partially submerged in the developer supply such as disclosed in U. S. Pat. No. 3,099,943. Deterioration occurs when portions of or the entire coating separates from the carrier core. The separation may be in the form of chips, flakes or entire layers and is primarily caused by fragile, poorly adhering coating materials which fail upon impact and abrasive contact with machine parts and other carrier particles. Carriers having coatings which tend to chip and otherwise separate from the carrier core must be frequently replaced thereby increasing expense and loss of productive time. Print deletion and poor print quality occur when carrier particles having damaged coatings are not replaced. Fines and grit formed from carrier disintegration tend to drift and form undesirable and damaging deposits on critical machine parts. Many carrier coatings having high compressive and tensile strength either do not adhere well to the carrier core or do not possess the desired triboelectric characteristics. The triboelectric and flow characteristics of many carriers are adversely affected when relative humidity is high. For example, the triboelectric values of some carrier coatings fluctuate with changes in relative humidity and are not desirable for employment in electrostatographic systems, particularly in automatic machines which require carriers having stable and predictable triboelectric values. Another factor affecting the stability of carrier triboelectric properties is the susceptibility of carrier coatings to "toner impaction". When carrier particles are employed in automatic machines and recycled through many cycles, the many collisions which occur between the carrier particles and other surfaces in the machine cause the toner particles carried on the surface of the carrier particles to be welded or otherwise forced into the carrier coatings. The gradual accumulation of permanently attached toner material on the surface of the carrier particles causes a change in the triboelectric value of the carrier particles and directly contributes to the degradation of copy quality by eventual destruction of the toner carrying capacity of the carrier. Thus, there is a continuing need for a better developer material for developing electrostatic latent images.

It is therefore an object of this invention to provide developers which overcome the above-noted deficiencies and are suitable for use in electrostatographic reproduction processes.

It is another object of this invention to provide carrier particles which possess improved electrostatic and physical properties for efficient and prolonged use in electrostatographic reproduction processes.

It is a further object of this invention to provide carrier particles having a hard and tough coating which tenaciously adheres to the carrier core whereby the carrier particles are more resistant to toner impaction, chipping and flaking.

It is another object of this invention to provide developing materials which flow more freely.

It is yet another object of this invention to provide carrier coatings having more stable triboelectric values.

It is a further object of this invention to provide carrier coatings having higher tensile and compressive strength.

It is yet another object of this invention to provide carrier coatings having greater resistance to disintegration.

It is still another object of this invention to provide more toner impaction resistant carrier coatings.

It is another object of this invention to provide developers having physical and chemical properties superior to those of known developer materials.

The above objects and others are accomplished, generally speaking, by providing a carrier for electrostatographic developer mixtures, said carrier comprising a core coated with a polysulfone. The polysulfone carrier coating materials of this invention may have the following generic structure:

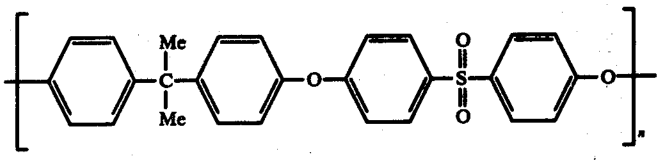

where *n* may be any integer between 50 and 80. In addition, the polysulfone carrier coating materials of this invention may be a polyarylsulfone having the following generic structure:

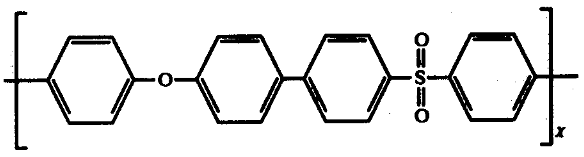

where X may be any integer between 50 and 80. Other substituted polysulfones are within the scope of this invention; for example, where the substituents are alkyl, halogen, alkoxy, acetoxy, and amino groups. In addition, mixtures of the polysulfones with other polymeric materials such as polycarbonates, polyacrylates, polymethacrylates, polyacetates, polyphenyl ethers and copolymers or terpolymers, such as polysulfone-siloxane block copolymers may also be employed.

The polysulfone carrier coating materials of this invention typically have a tensile strength of between about 10,200 and about 13,000 psi at about 75° F; a tensile elongation of between about 13 and about 100 percent; a flexural strength of between about 15,400 and about 17,000 psi; a Rockwell hardness of between about M-100 and about M-110; and a dielectric constant (60 Hz) of between about 3.14 and about 3.94 at about 75° F.

In general, the polysulfone coated carrier materials of the present invention are prepared by coating a granular carrier material comprising a core, base or substrate composed of any selected material which may be of high specific gravity such as glass or steel beads with a quantity of a polysulfone sufficient to impart the desired electrostatographic properties to the carrier material so that it will properly charge an electroscopic powder when mixed therewith, while maintaining such a relative specific gravity as to insure against adherence of the coated carrier material to an electrostatographic imaging surface. The coated core, base or substrate carrier material is then mixed with an electroscopic powder and employed in developing an electrostatic latent image.

It has been found that these polysulfone coated carrier coating materials provide electrostatographic carrier materials which exhibit coating hardness, durability, strong adhesion, and excellent chip resistance which are properties extremely useful in development of electrostatic latent images. In addition, these polysulfone coated carrier materials provide developer mixtures having triboelectric properties which are very desirable. Thus, the polysulfone carrier coating compositions of this invention may be employed to provide coated electrostatographic carrier materials having a thin, wear-resistant coating, either as a primer or as an overcoating. The resultant coated carrier materials are durable and strongly resistant to mechanical degradation.

The polysulfone electrostatographic carrier coating may be any suitable thickness. However, a carrier coating having a thickness at least sufficient to form a thin continuous film on a substrate is preferred because the carrier coating will then possess sufficient thickness to resist abrasion and prevent pinholes which adversely affect the triboelectric properties of the coated carrier particles. Generally, for cascade and magnetic brush development, the polysulfone polymer carrier coating may comprise from about 0.5 to about 10 microns in thickness. Preferably, the polysulfone electrostatographic carrier coating should comprise from about 0.5 to about 5 microns in thickness because maximum durability, toner impaction resistance, and copy quality are achieved.

Any suitable well known coated or uncoated carrier material may be employed as the substrate for the polysulfone coated electrostatographic carriers of this invention. Typical carrier core materials include sodium chloride, ammonium chloride, aluminum potassium chloride, Rochelle salt, sodium nitrate, potassium chlorate, granular zircon, granular silicon, methyl methacrylate, glass, silicon dioxide, flintshot, iron, steel, ferrite, nickel, carborundum and mixtures thereof. Many of the foregoing and other typical carrier materials are described by L. E. Walkup in U. S. Pat. No. 2,618,551; L. E. Walkup et al in U. S. Pat. No. 2,638,416; E. N. Wise in U. S. Pat. No. 3,245,823. An ultimate coated carrier particles having an average diameter between about 1 micron to about 1,000 microns may be employed. However, a coated carrier particle having an average diameter between about 30 microns and about 1000 microns is preferred because the carrier particle then possesses sufficient density and inertia to avoid adherence to the electrostatic image during the development process. Adherence of carrier particles to an electrostatographic drum is undesirable because of the formation of deep scratches on the drum surface during the image transfer and drum cleaning steps, particularly where cleaning is accomplished by a web cleaner such as disclosed by W. P. Graff, Jr. et al in U. S. Pat. No. 3,186,838.

Any suitable well known toner material may be employed with the polysulfone coated carriers of this invention. Typical toner materials include gum copal, gum sandarac, rosin, cumaroneindene resin, asphaltum, gilsonite, phenolformaldehyde resins, resin modified phenolformaldehyde resins, methacrylic resins, polystyrene resins, polypropylene resins, epoxy resins, polyethylene resins, polyester resins and mixtures thereof. The particular toner material to be employed obviously depends upon the separation of the toner particles from the polysulfone coated carrier in the triboelectric series and should be sufficient to cause the toner particles to electrostatically cling to the carrier surface. Among the patents describing electroscopic toner compositions are U. S. Pats. No. 2,659,670 to Copley; U. S. Pat. No. 2,753,308 to Landrigan; U. S. Pat. No. 3,079,342 to Insalaco; U. S. Pat. No. Re. 25, 136 to Carlson and U. S. Pat. No. 2,788,288 to Rheinfrank et al. These toners generally have an average particle diameter between about 1 and 30 microns.

Any suitable colorant such as a pigment or dye may be employed to color the toner particles. Toner colorants are well known and include, for example, carbon black, nigrosine dye, aniline blue, Calco Oil Blue, chrome yellow, ultramarine blue, Quinoline Yellow, methylene blue chloride, Monastral Blue, Malachite Green Ozalate, lampblack, Rose Bengal, Monastral Red, Sudan Black BM, and mixtures thereof. The pigment or dye should be present in the toner in a sufficient quantity to render it highly colored so that it will form a clearly visible image on a recording member. Preferably, the pigment is employed in an amount from about 3 percent to about 20 percent, by weight, based on the total weight of the colored toner because high quality images are obtained. If the toner colorant employed is a dye, substantially smaller quantities of colorant may be used.

Any suitable conventional toner concentration may be employed with the polysulfone coated carriers of this invention. Typical toner concentrations for cascade and magnetic brush development systems include about 1 part toner with about 10 to about 400 parts by weight of carrier.

Any suitable organic or inorganic photoconductive material may be employed as the recording surface with the polysulfone coated carriers of this invention. Typical inorganic photoconductor materials include: sulfur, selenium, zinc sulfide, zinc oxide, zinc cadmium sulfide, zinc magnesium oxide, cadmium selenide, zinc silicate, calcium strontium sulfide, cadmium sulfide, mercuric iodide, mercuric oxide, mercuric sulfide, indium trisulfide, gallium selenide, arsenic disulfide, arsenic trisulfide, arsenic triselenide, antimony trisulfide, cadmium sulfo-selenide and mixtures thereof. Typical organic photoconductors include: quinacridone pigments, phthalocyanine pigments, triphenylamine, 2,4-bis(4,4'-diethylamino-phenol)-2,3,4-oxadiazole, N-isopropylcarbazole, triphenyl-pyrrol, 4,5-diphenylimidazolidone, 4,5-diphenylimidazolidinethione, 4,5-bis-(4'-amino-phenyl)imidazolidinone, 1,5-dicyanonaphthalene, 1,4-dicyanonaphthalene, aminophthalodinitrile, nitrophthalodinitrile, 1,2,5,6-tetraazacyclooctatetraene-(2,4,6,8), 2-mercaptobenzothiazole-2-phenyl-4-diphenylidene-oxazolone, 6-hydroxy-2,3-di(p-methoxy-phenyl)-benzofurane, 4-dimethylamino-benzylidene-benzhydrazide, 3-benzylidene-amino-carbazole, polyvinyl carbazole, (2-nitrobenzylidene)-p-bromoaniline, 2,4-diphenyl-quinazoline, 1,2,4-triazine, 5-diphenyl-3-methyl-pyrazoline, 2-(4'-dimethylamino phenyl)-benzoxazole, 3-amino-carbazole, and mixtures thereof. Representative patents in which photoconductive materials are disclosed include U. S. Pats. No. 2,803,542 to Ullrich, U. S. Pat. No. 2,970,906 to Bixby, U. S. Pat. No. 3,121,006 to Middleton, U. S. Pat. No. 3,121,007 to Middleton, and U. S. Pat. No. 3,151,982 to Corrsin.

Polysulfone carrier coatings provide numerous advantages to an electrostatographic carrier because they confer a uniform coating and yield better batch to batch reproducibility than current carriers. Further, the carrier coatings provide exceptionally good life performance, durability, copy quality, quality maintenance, less coated carrier bead sticking and agglomeration, and also provide improved abrasion resistance thereby minimizing carrier coating chipping and flaking.

The surprising results obtained with the polysulfone coated electrostatographic carrier materials of this invention may be due to many factors. For example, the marked durability of the carrier coating may be due to the fact that these polysulfone polymers adhere extremely well to the substrates tested. Outstanding abrasion resistance is obtained when the polysulfone coating materials are applied to steel or similar metallic particles. Carrier materials prepared in accordance with this invention possess smooth outer surfaces which are highly resistant to cracking, chipping, and flaking. In cascade development systems, the smooth tough surface enhances the rolling action of carrier particles across the electrostatographic surfaces and reduces the tendency of carrier particles to adhere to the electrostatographic imaging surfaces. When these polysulfone coated carrier materials are employed in developer mixtures, carrier life is unexpectedly extended, particularly with respect to stability of triboelectric properties. Additionally, the hydrophobic properties of the carrier coating material appear to contribute to the stability of the triboelectric properties of the coated carrier over a wide relative humidity range.

The polysulfone polymer carrier coatings of the present invention are nontacky and have sufficient hardness at normal operating temperatures to minimize impaction; form strong adhesive coatings which resist flaking under normal operating conditions, have triboelectric properties such that they can be used with a wide variety of presently available toners in present electrostatographic processes and are hydrophobic so that they retain a predictable triboelectric value. Thus, the coated carrier particles of this invention have desirable properties which permit their wide use in presently available electrostatographic processes.

In the following examples, the relative triboelectric values generated by contact of carrier beads with toner particles is measured by means of a Faraday Cage. The device comprises a brass cylinder having a diameter of about 1 inch and a length of about 1 inch. A 100 mesh screen is positioned at each end of the cylinder. The cylinder is weighed, charged with about a 0.5 gram mixture of carrier and toner particles and connected in parallel. Dry compressed air is then blown through the brass cylinder to drive all the toner from the carrier. The charge on the capacitor is then read on the electrometer. Next, the chamber is reweighed to determine the weight loss. The resulting data is used to calculate the toner concentration and the charge in microcoulombs per gram of toner. Since the triboelectric measurements are relative, the measurements should, for comparative purposes, be conducted under substantially identical conditions. Thus, a toner comprising a styrene-n-butyl methacrylate copolymer and carbon black as disclosed by M. A. Insalaco in U. S. Pat. No. 3,079,342 is used as a contact triboelectrification standard in the examples. Obviously, other suitable toners such as those listed above may be substituted for the toner used in the examples.

The following examples, other than the control examples, further define, describe, and compare preferred methods of preparing and utilizing the polysulfone polymer coated carriers of the present invention in electrostatographic applications. Parts and percentages are by weight unless otherwise indicated.

EXAMPLE I

About 10 pounds of steel beads having an average particle diameter of about 250 microns, and about 130 ml. of a coating solution containing about 10 percent of a terpolymer comprising styrene, methyl methacrylate, and vinyl triethoxysilane as taught in U. S. Pat. No. 3,526,533 were placed in a Vibratub (available from Vibraslide, Inc., Binghamton, N. Y.) and heated to about 73° C with agitation. The solvent employed for the coating solution was toluene. After mixing for about 15 minutes, the coating solvent was removed under vacuum. The coated carrier beads were then sieved to separate any undesirable agglomerates. The carrier beads were determined to have a terpolymer coating of about 0.3 percent by weight based on the weight of the beads. The integrity of the terpolymer coating was then determined by the Turnbull Blue test which is based on the principal that uncoated iron or iron oxide would react with potassium ferric-cyanide to yield ferro ferrocyanide (Turnbull's Blue) which solution would absorb light at 700 nm. Coating integrity was determined to be between about 98 to 99 percent.

About 15 grams of the terpolymer coated steel beads were mixed with about 45 grams of steel bearings having an average size of about 2 mm. and placed in a glass jar. The mixture was roll-milled at about 275 r.p.m. for about 8 hours at room temperature. After milling, the terpolymer coated steel beads were separated and examined for polymer degradation. The terpolymer coating was dissolved in tetrahydrofuran and the solution subjected to gel permeation chromatography analysis. The analysis showed new peaks in the GPC trace and shifts of the original peak which formed the basis of concluding that mechanical degradation of the polymer occurred due to chain scission.

An adhesion test was performed by a tensile-pull method to determine the adhesion between the terpolymer and steel. The method involved uniformly casting a film of the polymer having a thickness of about 2 microns onto a steel plate. A dolly was adhered to the film and the force required to pull the dolly by an Elcometer tester from the steel plate was recorded as the tensile pull strength. The values recorded averaged 130 psi which indicate weak adhesive strength between this polymer and metal substrates such as steel.

An electrostatographic developer mixture was prepared by mixing about 1 part colored styrene-n-butyl methacrylate copolymer toner particles with about 99 parts of the terpolymer coated carrier particles. The relative triboelectric value of the carrier measured by means of a Faraday Cage was about 17.5 microcoulombs per gram of toner after roll-milling the developer mixture in a colorless glass jar at about 300 r.p.m. for about 90 minutes. Substantial toner impaction and carrier coating abrasion were observed.

EXAMPLE II

About 10 pounds of steel beads having an average particle diameter of about 250 microns, and about 260 ml. of a coating solution containing about 5 percent of polysulfone (available from Union Carbide Corp.) were placed in a Vibratub (available from Vibraslide, Inc., Binghamton, N.Y.) and heated to about 73° C with agitation. The solvents employed for the coating solution were toluene-acetone-cyclohexanone at a 65:25:10 ratio. After mixing for about 15 minutes, the coating solvents were removed under vacuum. The coated carrier beads were then sieved to separate any undesirable agglomerates. The carrier beads were determined to have a polysulfone coating of about 0.3 percent by weight based on the weight of the beads. The integrity of the polysulfone coating was then determined by the Turnbull Blue test as in Example I. Coating integrity was determined to be about 98 percent.

About 15 grams of the polysulfone coated steel beads were mixed with about 45 grams of steel bearings having an average size of about 2 mm. and placed in a glass jar. The mixture was roll-milled at about 275 r.p.m. for about 8 hours at room temperature. After milling, the polysulfone coated steel beads were separated and examined for polymer degradation. The polysulfone coating was dissolved in tetrahydrofuran and the solution subjected to gel permeation chromatography analysis. The analysis showed no new peak in the GPC trace and no shift of the original peak which formed the basis of concluding that no mechanical degradation of the polymer occured due to chain scission. A fresh mixture of the polysulfone coated steel carrier beads was roll-milled for up to 88 hours under the aforementioned conditions. At the end of 88 hours of roll-milling, the beads were examined and the polysulfone coating was found to have retained its initial shiny appearance.

An adhesion test was performed by a tensile-pull method to determine the adhesion between the polysulfone polymer and steel. The method involved uniformly casting a film of the polymer having a thickness of about 2 microns onto a steel plate. A dolly was adhered to the film and the force required to pull the dolly by an Elcometer tester from the steel plate was recorded as the tensile pull strength. The values recorded averaged 156 psi which indicate good adhesive strength between this polymer and metal substrates such as steel.

An electrostatographic developer mixture was prepared by mixing about 1 part colored styrene-n-butyl methacrylate copolymer toner particles with about 99 parts of the polysulfone coated carrier particles. The relative triboelectric value of the carrier measured by means of a Faraday Cage was about 3.1 micro-coulombs per gram of toner after roll-milling the developer mixture in a colorless glass jar at about 300 r.p.m. for about 90 minutes. Substantially no toner impaction and no coating carrier abrasion were observed.

EXAMPLE III

About 10 pounds of nickel-zinc ferrite beads having an average particle diameter of about 100 microns, and about 450 ml. of a coating solution containing about 5 percent of polysulfone (available from Union Carbide Corp.) were placed in a Vibratub (available from Vibraslide, Inc., Binghamton, N.Y.) and heated to about 73° C with agitation. The solvents employed for the coating solution were toluene-acetone-cyclohexanone at 65:25:10 ratio. After mixing for about 15 minutes, the coating solvents were removed under vacuum. The coated carrier beads were then sieved to separate any undesirable agglomerates. The carrier beads were determined to have a polysulfone coating of about 0.5 percent by weight based on the weight of the beads. The integrity of the polysulfone coating was then determined by the Turnbull Blue test as in Example I. Coating integrity was determined to be about 98 percent.

About 15 grams of the polysulfone coated ferrite beads were mixed with about 45 grams of steel bearings having an average size of about 2 mm. and placed in a glass jar. The mixture was roll-milled at about 275 r.p.m. for about 8 hours. After milling, the polysulfone coated ferrite beads were separated and examined for polymer degradation. The polysulfone coating was dissolved in tetrahydrofuran and the solution subjected to gel permeation chromatography analysis. The analysis showed no new peak in the GPC trace and no shift of the original peak which formed the basis of concluding that no mechanical degradation of the polymer occured due to chain scission.

An electrostatographic developer mixture was prepared by mixing about 1 part colored styrene-n-butyl methacrylate copolymer toner particles with about 99 parts of the polysulfone coated carrier particles. The relative triboelectric value of the carrier measured by means of a Faraday Cage was about 11.7 microcoulombs per gram of toner after roll-milling the developer mixture in a colorless glass jar at about 300 r.p.m. for about 90 minutes. Substantially no toner impaction and no coating carrier abrasion were observed.

EXAMPLE IV

About 10 pounds of nickel-zinc ferrite beads having an average particle diameter of about 100 microns, and about 630 g. of a coating solution containing about 5 percent of polysulfone (available from Union Carbide Corp.) were placed in a Vibratub (available from Vibraslide, Inc., Binghamton, N.Y.) and heated to about 73° C with agitation. The solvents employed for the coating solution were toluene-acetone-cyclohexanone at a 65:25:10 ratio. After mixing for about 15 minutes, the coating solvents were removed under vacuum. The coated carrier beads were then sieved to separate any undesirable agglomerates. The carrier beads were determined to have a polysulfone coating of about 0.7 percent by weight based on the weight of the beads. The integrity of the polysulfone coating was then determined by the Turnbull Blue test as in Example I. Coating integrity was determined to be about 98 percent.

About 15 grams of the polysulfone coated ferrite beads were mixed with about 45 grams of steel bearings having an average size of about 2 mm. and placed in a glass jar. The mixture was roll-milled at about 275 r.p.m. for about 8 hours. After milling, the polysulfone coated ferrite beads were separated and examined for polymer degradation. The polysulfone coating was dissolved in tetrahydrofuran and the solution subjected to gel permeation chromatography analysis. The analysis showed no new peak in the GPC trace and no shift of the original peak which formed the basis of concluding that no mechanical degradation of the polymer occurred due to chain scission.

An electrostatographic developer mixture was prepared by mixing about 1 part colored styrene-n-butyl methacrylate compolymer toner particles with about 99 parts of the polysulfone coated carrier particles. The relative triboelectric value of the carrier measured by means of a Faraday Cage was about 14.9 micro-coulombs per gram of toner after roll-milling the developer mixture in a colorless glass jar at about 300 r.p.m. for about 90 minutes. Substantially no toner impaction and no coating carrier abrasion were observed.

EXAMPLE V

About 10 pounds of nickel-zinc ferrite beads having an average particle diameter of about 100 microns, and about 260 g. of a coating solution containing about 5 percent of polysulfone (available from Union Carbide Corp.) were placed in a Vibratub (available from Vibraslide, Inc., Binghamton, N.Y.) and heated to about 73° C with agitation. The solvents employed for the coating solution were toluene-acetone-cyclohexanone at a 65:25:10 ratio. After mixing for about 15 minutes, the coating solvents were removed under vacuum. The coated carrier beads were then sieved to separate any undesirable agglomerates. The carrier beads were determined to have a polysulfone coating of about 0.3 percent by weight based on the weight of the beads. The coated carrier beads were applied a second coating comprising a terpolymer containing styrene, methyl methacrylate, and vinyl triethoxysilane as taught in U. S. Pat. No. 3,526,533 at a coating weight of about 0.3 percent by weight based on the weight of the carrier beads.

About 15 grams of the coated ferrite beads were mixed with about 45 grams of steel bearing having an average size of about 2 mm. and placed in a glass jar. The mixture was roll-milled at about 275 r.p.m. for about 8 hours. After milling, the coated ferrite beads were separated and examined for polymer degradation. The terpolymer coating was dissolved in tetrahydrofuran and the solution subjected to gel permeation chromatography analysis. The analysis showed no new peak in the GPC trace and no shift of the original peak which formed the basis of concluding that no mechanical degradation of the terpolymer occured due to chain scission.

An electrostatographic developer mixture was prepared by mixing about 1 part colored styrene-n-butyl methacrylate copolymer toner particles with about 99 parts of the polysulfone and terpolymer coated carrier particles. The relative triboelectric value of the carrier measured by means of a Faraday Cage was about 16.7 micro-coulombs per gram of toner after roll-milling the developer mixture in a colorless glass jar at about 300 r.p.m. for about 90 minutes. Substantially no toner impaction and no coating carrier abrasion were observed.

Although specific materials and conditions were set forth in the above examples for making and using the developer materials of this invention, these are merely intended as illustrations of the present invention. Various other toners, carrier cores, substituents and processes such as those listed above may be substituted for those in the examples with similar results.

Other modifications of the present invention will occur to those skilled in the art upon a reading of the present disclosure. These are intended to be included within the scope of this invention.

What is claimed is:

1. A carrier particle for electrostatographic developer mixtures, said carrier particle having an average diameter from between about 1 micron and about 1,000 microns, said carrier particle comprising a metallic core having an outer coating, said outer coating comprising a polysulfone.

2. A carrier particle for electrostatographic developer mixtures, said carrier particle having an average diameter from between about 1 micron and about 1,000 microns, said carrier particle comprising a core having an outer coating, said outer coating comprising a polysulfone having the generic structure:

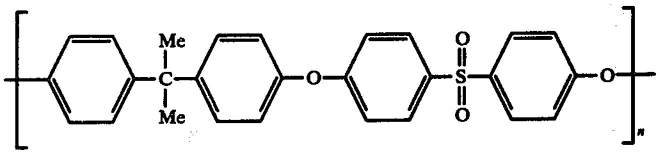

where $n$ may be any integer between 50 and 80.

3. A carrier particle for electrostatographic developer mixtures, said carrier particle having an average diameter from between about 1 micron and about 1,000 microns, said carrier particle comprising a core having an outer coating, said outer coating comprising a polyarylsulfone having the generic structure:

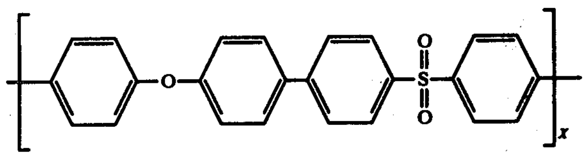

where X may be any integer between 50 and 80.

4. A carrier particle for electrostatographic developer mixtures, said carrier particle having an average diameter from between about 1 micron and about 1,000 microns, said carrier particle comprising a metallic core having an outer coating, said outer coating comprising a substituted polysulfone wherein the substituent groups are selected from alkyl, halogen, alkoxy, acetoxy and amino groups.

5. A carrier particle for electrostatographic developer mixtures, said carrier particle having an average diameter from between about 1 micron and about 1,000 microns, said carrier particle comprising a core having an outer coating, said outer coating comprising a block copolymer consisting of polysulfone-siloxane.

6. A carrier particle for electrostatographic developer mixtures, said carrier particle having an average diameter from between about 1 micron and about 1,000 microns, said carrier particle comprising a core having an outer coating, said outer coating comprising a mixture of polysulfone and polymeric materials selected from the group consisting of polycarbonates, polyacrylates, polymethacrylates, polyacetates, and polyphenyl ethers.

7. A carrier particle for electrostatographic developer mixtures, said carrier particle having an average diameter from between about 1 micron and about 1,000 microns, said carrier particle comprising a metallic core having an outer coating, said outer coating comprising a polysulfone wherein said polysulfone has a tensile strength of between about 10,200 and about 13,000 psi at about 75° F, a tensile elongation of between about 13 and about 100 percent, a flexural strength of between about 15,400 and about 17,000 psi, a Rockwell hardness of between about M-100 and about M-110, and a dielectric constant (60 Hz) of between about 3.14 and about 3.94 at about 75° F.

8. A carrier particle for electrostatographic developer mixtures, said carrier particle having an average diameter from between about 1 micron and about 1,000 microns, said carrier particle comprising a metallic core having an outer coating present in an amount of from between about 0.5 micron and about 10 microns in thickness, said outer coating comprising a polysulfone.

9. An electrostatographic developer mixture comprising finely-divided toner particles electrostatically clinging to the surface of carrier particles having an average diameter from between about 1 micron and about 1,000 microns, said carrier particles comprising a core having an outer coating, said outer coating comprising a polysulfone.

10. An electrostatographic developer mixture in accordance with claim 9 wherein said polysulfone has the generic structure:

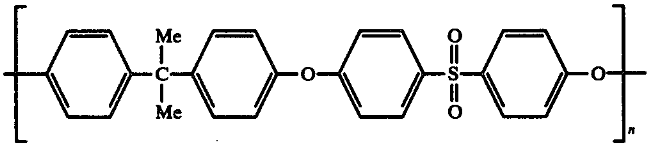

where *n* may be any integer between 50 and 80.

11. An electrostatographic developer mixture in accordance with claim 9 wherein said polysulfone is a polyarylsulfone having the generic structure:

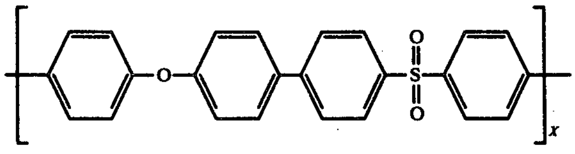

where X may be any integer between 50 and 80.

12. An electrostatographic developer mixture in accordance with claim 9 wherein said polysulfone is a substituted polysulfone and the substituent groups are selected from alkyl, halogen, alkoxy, acetoxy, and amino groups.

13. An electrostatographic developer mixture in accordance with claim 9 wherein said polysulfone is a block copolymer consisting of polysulfone-siloxane.

14. An electrostatographic developer mixture in accordance with claim 9 wherein said polysulfone is a mixture of polysulfone and polymeric materials selected from the group consisting of polycarbonates, polyacrylates, polymethacrylates, polyacetates, and polyphenyl ethers.

15. An electrostatographic developer mixture in accordance with claim 9 wherein said polysulfone has a tensile strength of between about 10,200 and about 13,000 psi at about 75° F, a tensile elongation of between about 13 and about 100 percent, a flexural strength of between about 15,400 and about 17,000 psi, a Rockwell hardness of between about M-100 and about M-110, and a dielectric constant (60 Hz) of between about 3.14 and about 3.94 to about 75° F.

16. An electrostatographic developer mixture in accordance with claim 9 wherein said toner particles are present in an amount of from between about 1 part and about 10 parts by weight of about 400 parts by weight of said carrier particles.

17. An electrostatographic imaging process comprising the steps of providing an electrostatographic imaging member having a recording surface, forming an electrostatic latent image on said recording surface, and contacting said electrostatic latent image with a developer mixture comprising finely-divided toner particles electrostatically clinging to the surface of carrier particles having an average diameter from between about 1 micron and about 1,000 microns, said carrier particles comprising a core having an outer coating, said outer coating comprising a polysulfone, whereby at least a portion of said finely-divided toner particles are attracted to and deposited on said recording surface in conformance with said electrostatic latent image.

18. An electrostatographic imaging process in accordance with claim 17 wherein said polysulfone has the generic structure:

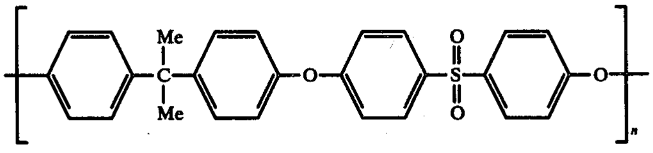

where *n* may be any integer between 50 and 80.

19. An electrostatographic imaging process in accordance with claim 17 wherein said polysulfone is a polyarylsulfone having the generic structure:

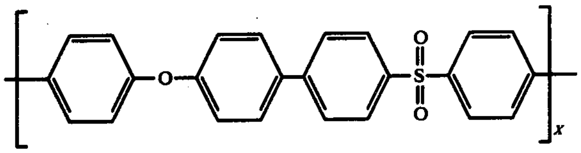

where X may be any integer between 50 and 80.

20. An electrostatographic imaging process in accordance with claim 17 wherein said polysulfone is a substituted polysulfone and the substituent groups are selected from alkyl, halogen, alkoxy, acetoxy, and amino groups.

21. An electrostatographic imaging process in accordance with claim 17 wherein said polysulfone is a block copolymer consisting of polysulfone-siloxane.

22. An electrostatographic imaging process in accordance with claim 17 wherein said polysulfone is a mixture of polysulfone and polymeric materials selected from the group consisting of polycarbonates, polyacrylates, polymethacrylates, polyacetates, and polyphenyl ethers.

23. An electrostatographic imaging process in accordance with claim 17 wherein said polysulfone has a tensile strength of between about 10,200 and about 13,000 psi at about 75° F, a tensile elongation of between about 13 and about 100 percent, a flexural strength of between about 15,400 and about 17,000 psi, a Rockwell hardness of between about M-100 and about M-110, and a dielectric constant (60 Hz) of between about 3.14 and about 3.94 at about 75° F.

24. An electrostatographic imaging process in accordance with claim 17 wherein said toner particles are present in an amount of from between about 1 part and about 10 parts by weight to about 400 parts by weight of said carrier particles.

* * * * *